US011367125B1

(12) United States Patent
Gau et al.

(10) Patent No.: US 11,367,125 B1
(45) Date of Patent: Jun. 21, 2022

(54) SYSTEMS AND METHODS FOR PROCESSING ELECTRONIC REQUESTS

(71) Applicant: WAITBUSTERS LLC, Clarksville, VA (US)

(72) Inventors: Shane Gau, Clarksville, VA (US); James Moody, Clarksville, VA (US)

(73) Assignee: WAITBUSTERS LLC, Clarksville, VA (US)

( * ) Notice: Subject to any disclaimer, the term of this patent is extended or adjusted under 35 U.S.C. 154(b) by 255 days.

(21) Appl. No.: 16/843,181

(22) Filed: Apr. 8, 2020

Related U.S. Application Data

(60) Provisional application No. 62/831,901, filed on Apr. 10, 2019.

(51) Int. Cl.
| | |
|---|---|
| *G06Q 20/20* | (2012.01) |
| *G06Q 30/06* | (2012.01) |
| *G06F 16/22* | (2019.01) |
| *G06Q 10/08* | (2012.01) |
| *H04L 67/06* | (2022.01) |
| *H04L 67/55* | (2022.01) |
| *H04L 51/046* | (2022.01) |
| *H04L 67/60* | (2022.01) |
| *G06Q 10/10* | (2012.01) |
| *H04L 67/01* | (2022.01) |

(52) U.S. Cl.
CPC ......... *G06Q 30/0635* (2013.01); *G06F 16/22* (2019.01); *G06Q 10/0875* (2013.01); *G06Q 10/107* (2013.01); *G06Q 20/202* (2013.01); *G06Q 30/0641* (2013.01); *H04L 51/046* (2013.01); *H04L 67/06* (2013.01); *H04L 67/26* (2013.01); *H04L 67/32* (2013.01); *G06Q 10/083* (2013.01); *H04L 67/42* (2013.01)

(58) Field of Classification Search
CPC .................................................... G06Q 20/202
USPC ............................................................ 705/21
See application file for complete search history.

(56) References Cited

U.S. PATENT DOCUMENTS

| | | | | |
|---|---|---|---|---|
| 5,870,724 | A * | 2/1999 | Lawlor ................ | G06Q 20/108 705/14.69 |
| 9,900,309 | B2 * | 2/2018 | Toth .................... | H04L 63/0823 |
| 9,929,743 | B1 * | 3/2018 | Acuña-Rohter ....... | G06Q 40/04 |
| 10,102,515 | B2 * | 10/2018 | Vastenavondt ...... | G06Q 20/227 |
| 10,489,777 | B2 * | 11/2019 | Kusnanto ............ | H04L 63/0807 |

(Continued)

*Primary Examiner* — Andrew Joseph Rudy
(74) *Attorney, Agent, or Firm* — Foley & Lardner LLP

(57) ABSTRACT

Disclosed herein are embodiments of systems, methods, and products comprises an analytic server for aggregating and displaying all the electronic requests on one merchant device. The analytic server receives a plurality of electronic messages corresponding to a plurality of electronic requests from a plurality of service provider computers. The analytic server executes an extraction protocol to extract the order data within each electronic messages and stores the extracted data into a database. The analytic server generates a machine-readable file for each merchant comprising all the order records for the same merchant received from different third-party service provider computers. The analytic server transmits the machine-readable file to the merchant computing device, which populates a GUI according to the machine-readable file. Because all the orders are in one spot, the merchant may manage the orders, perform statistical calculations, and generate sales reports more efficiently.

11 Claims, 10 Drawing Sheets

(56) References Cited

U.S. PATENT DOCUMENTS

| | | | |
|---|---|---|---|
| 10,719,219 B1* | 7/2020 | Pierce | G06F 9/451 |
| 10,754,504 B2* | 8/2020 | Singh | G06F 9/451 |
| 2013/0218658 A1* | 8/2013 | Crowe | G06Q 30/02 |
| | | | 705/14.33 |
| 2018/0144389 A1* | 5/2018 | Fredrich | G06Q 30/0633 |
| 2018/0365753 A1* | 12/2018 | Fredrich | H04W 4/021 |
| 2019/0097812 A1* | 3/2019 | Toth | H04L 9/3213 |
| 2020/0351556 A1* | 11/2020 | Zhao | H04N 21/4147 |
| 2021/0406984 A1* | 12/2021 | Fredrich | G06Q 30/0633 |

* cited by examiner

SYSTEMS AND METHODS FOR PROCESSING ELECTRONIC REQUESTS

CROSS REFERENCE TO RELATED APPLICATIONS

This application claim priority to U.S. Provisional Application No. 62/831,901, filed Apr. 10, 2019, which is incorporated by reference herein in its entirety.

TECHNICAL FIELD

This application relates generally to methods, systems, and a system architecture for processing electronic requests.

BACKGROUND

As the processing power of computers allows for greater computer functionality and the Internet technology era allows for interconnectivity between computing systems, many users utilize different platforms to submit electronic requests. For instance, users may utilize different food delivery applications to submit food delivery requests to a server associated with a restaurant. As a result, servers satisfying these electronic requests (e.g., restaurant servers) typically receive a high volume of requests. The different platforms utilized by the users may serve as connecting interfaces between the sender generating the electronic requests (e.g., users) and the receiver addressing the electronic requests (e.g., restaurant server). While utilizing different platforms is highly desirable for the users, many technical challenges have been identified on the server side. For instance, different platforms utilize different (and sometime incompatible) data formats and require the server to acquire specific software and hardware devices. For instance, a restaurant may be required to own multiple hardware devices each specific to a platform. This is costly and highly inefficient because managing the high volume of electronic requests from different platforms received via different hardware devices may be difficult.

As shown in the system 100A illustrated in FIG. 1A, restaurants offering online ordering services may be required to have multiple tablets and printers for the online ordering requests received via different platforms. As illustrated, customers may use customer devices 102A, 102B, 102C to submit online orders to the same restaurant using different service provider platforms. The different service provider computers 104A, 104B, 104C may have their own databases 105A, 105B, 105C to store customer or restaurant data. Conventionally, different service provider computers 104A, 104B, 104C may receive the online order and deliver the requests to their own receiving devices 106A, 106B, 106C located at the restaurant through network 108. For instance, a first customer may use a platform of a first service provider server 104A to submit an online order. The first platform may comprise a graphical user interface (GUI) displayed on the first customer's device 102A that is configured to receive the request. The first service provider server 104A may receive the request and deliver the request to its hardware device 106A, which is located at the restaurant. A second customer may use a platform of a second service provider server 104B to submit the online order. The second platform may comprise a GUI displayed on the second customer's device 102B that is configured to receive the request. The second service provider server 104B may receive the request and deliver the request to its hardware device 106B, which is located at the same restaurant. A third customer may use a platform of a third service provider server 104C to submit an online order. The third platform may comprise a GUI displayed on the third customer's device 102C that is configured to receive the request. The third service provider server 104C may receive the request and deliver the request to its hardware device 106C, which is located at the same restaurant.

The above-described conventional method is highly undesirable. As described above, the restaurant may receive multiple electronic requests (e.g., online orders) from multiple devices 106A, 106B, 106C where each device is specific to a different platform. This creates inefficiencies and wastes electronic resources because the restaurant owner is required to own and manage multiple hardware devices.

SUMMARY

For the aforementioned reasons, what is needed is a computer-implemented system and method for efficiently processing electronic requests. What is further needed is a system and method with minimum receiving devices for the electronic requests. What is also needed is a new system architecture that can efficiently aggregate electronic requested submitted via different platforms and generate a single GUI that displays the aggregated requests.

Embodiments disclosed herein address the above challenges by aggregating and displaying all the electronic requests on one merchant device even through the electronic requests may come through different third-party service provider computers. Specifically, an analytic server receives a plurality of electronic messages corresponding to a plurality of electronic requests from a plurality of service provider computers. The analytic server executes an extraction protocol to extract the order data within each electronic messages and stores the extracted data into a database. The analytic server generates a machine-readable file for each merchant comprising all the order records for the same merchant received from different third-party service provider computers. The analytic server transmits the machine-readable file to the merchant computing device, which populates a GUI according to the machine-readable file.

In an embodiment, a method comprises receiving, by a server from a plurality of service provider computers, a plurality of electronic messages corresponding to a plurality of requests, each electronic message comprising order data corresponding to each request, the order data of each electronic message comprising: at least one requested item, a first identifier of a user initiating the request, a second identifier of at least one service provider computer within the plurality of service provider computers transmitting the electronic message to the server, and a third identifier of a merchant satisfying the request; executing, by the server, an extraction protocol to extract the order data corresponding to each request within each electronic message; identifying, by the server, a client computing device associated with the merchant; generating, by the server, a machine-readable file comprising the extracted order data; and transmitting, by the server, the machine-readable file to the identified client computing device, whereby the identified client computing device populates a graphical user interface according to the machine-readable file, the graphical user interface comprising a first indicator corresponding to the requested item and a second indicator corresponding to the second identifier.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 3 illustrates an example of a graphical user interface displayed on a merchant computing device, according to an embodiment.

FIG. 6 illustrates an example of a graphical user interface for editing a promotion message, according to an embodiment.

DETAILED DESCRIPTION

Figure 1A:
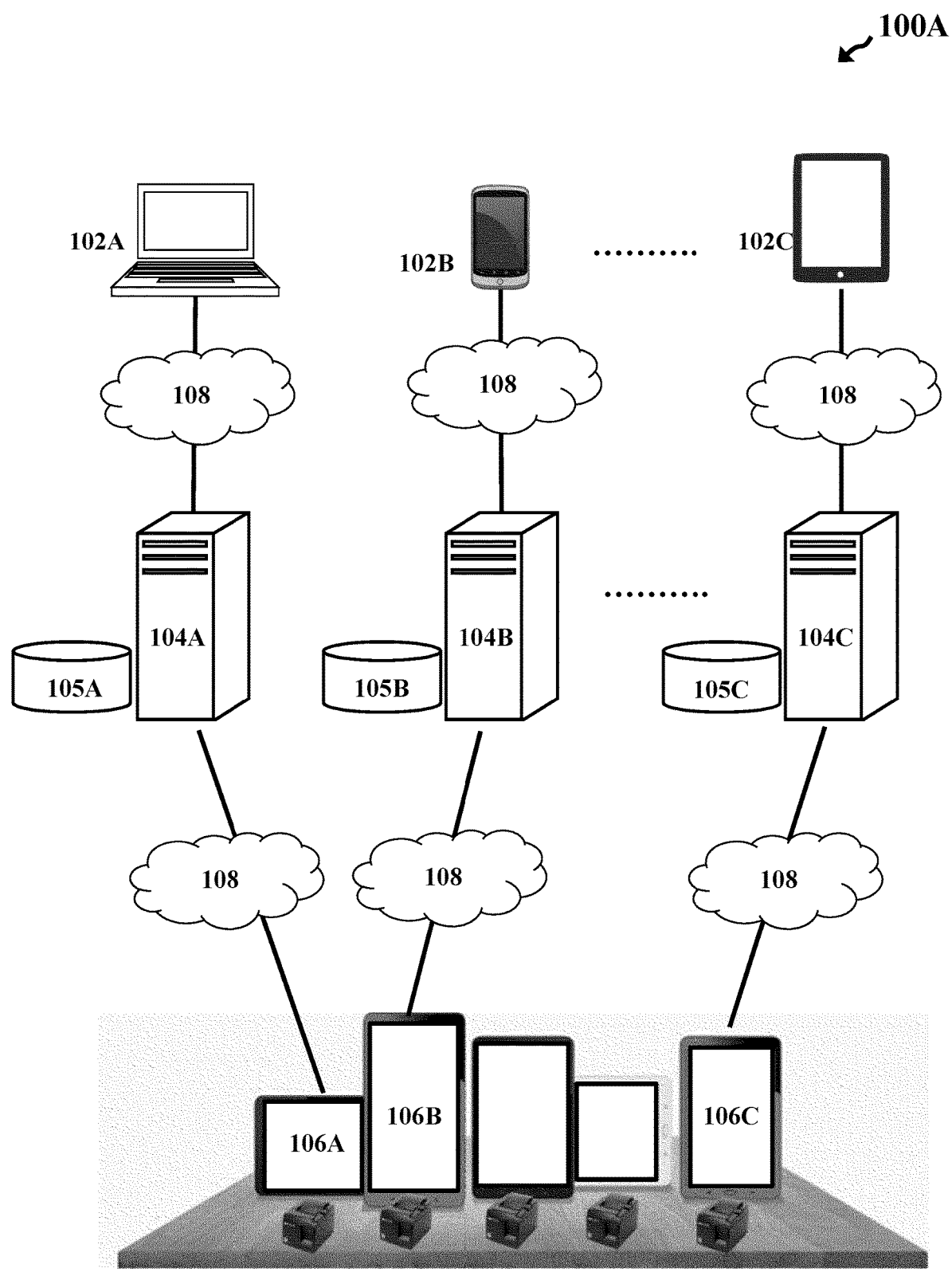
FIG. 1A illustrates a computer system for processing electronic requests, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for aggregating all the online orders coming through different third-party service provider computers and generate a machine-readable file that includes all the orders in one spot. An analytic server may receive a plurality of electronic requests with online orders from a plurality of service provider computers. The analytic server may extract the order data of the electronic messages received via different service provider platforms and store the order data into a database. The analytic server may generate a machine-readable file for each merchant comprising all the order records for the same merchant and generate a GUI displaying all the orders on the merchant computing device. Because the analytic server displays all the online orders received via different service provider platforms in the same GUI, the merchant may be able to process the orders more efficiently without having to managing different hardware devices of the different service providers. The GUI may comprise interactive components that allow the merchant to manage the orders and update the status of the orders.

The analytic server may create the customer dataset by collecting the online orders from different service providers, extracting the customer data, and saving the extracted customer data into a database. Based on such customer data, the analytic server may create an online ordering platform that connects the merchant and the customers directly. In this way, the analytic server may acquire the customers and migrate the customers to the internal online ordering system over time. As a result, the third-party service providers may become unnecessary and the merchants may save a large amount of money from paying the third-party service providers commission fees and maximize their revenue.

The internal online ordering system provided by the analytic server may provide GUIs to allow merchants to manage customer profiles, create campaigns by sending out marketing messages to the customer, edit promotion messages, receiving online orders, and create menus. The internal online ordering system may provide GUIs to allow customers to submit online order through different interfaces, such as on a website, through virtual assistants (e.g., Amazon Alexa), through Facebook messenger chatbot, on the merchant's Facebook business page, or via SMS messages.

Figure 1B:
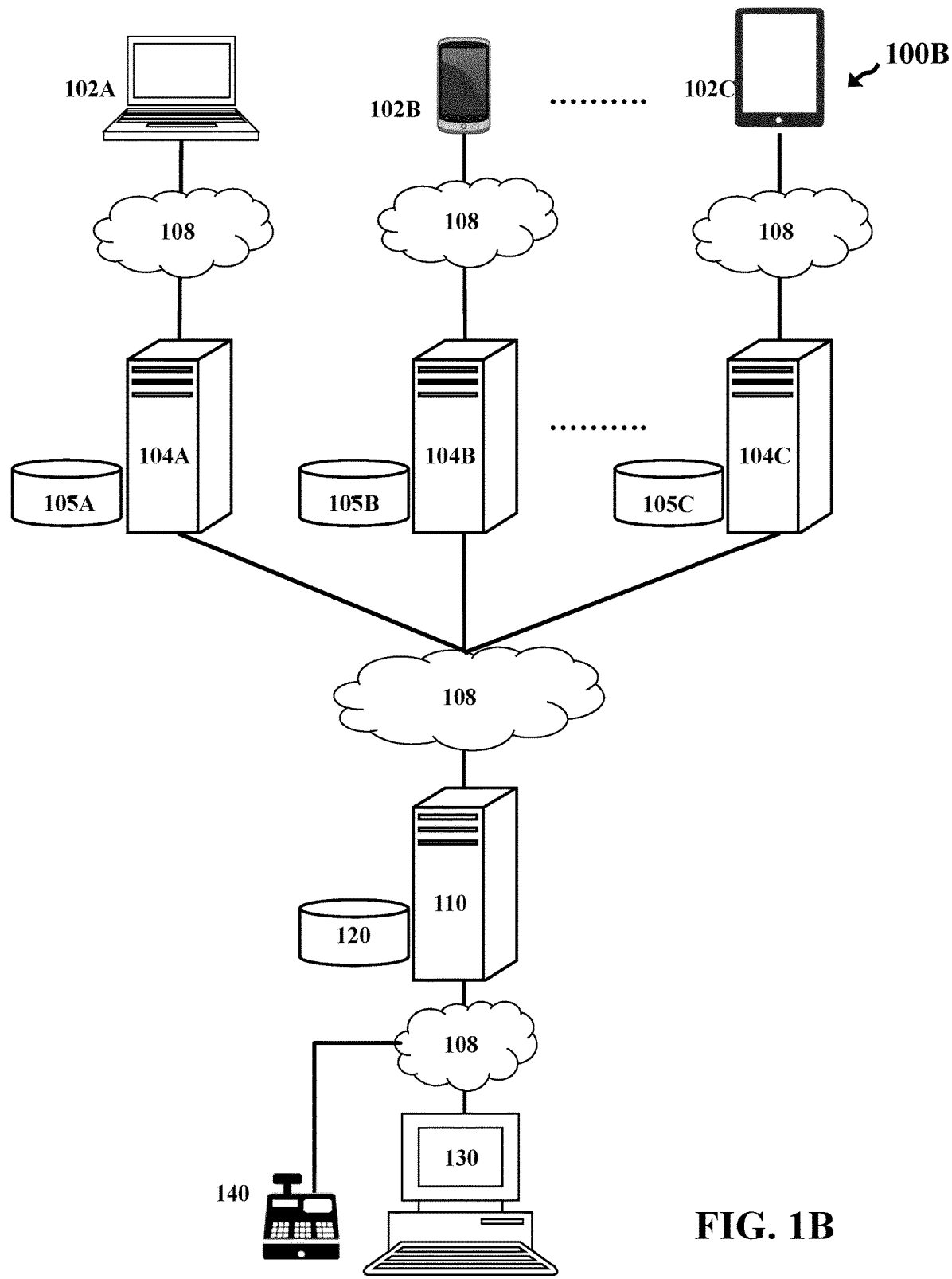
FIG. 1B illustrates components of a system for processing electronic request, according to an embodiment.

FIG. 1B illustrates components of a system 100B for processing electronic request, according to an embodiment. The system 100B may comprise an analytic server 110, a database 120, a set of electronic user devices 102A, 102B, 102C (collectively and commonly referred to as 102), a set of third-party service provider computers 104A, 104B, 104C (collectively and commonly referred to as 104), and a merchant computing device 130 that are connected with each other via hardware and software components of one or more networks 108. The third-party service provider computers 104 may have their own database 105A, 105B, 105C (collectively and commonly referred to as 105). Examples of the network 108 include, but are not limited to, Local Area Network (LAN), Wireless Local Area Network (WLAN), Metropolitan Area Network (MAN), Wide Area Network (WAN), and the Internet. The communication over the network 108 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to receive and process electronic requests. The analytic server 110 may be logically and physically organized within the same or different devices or structures, and may be distributed across any number of physical structures and locations (e.g., cabinets, rooms, buildings, cities). The analytic server 110 may receive a plurality of electronic requests from a plurality of electronic user devices 102 via the set of third-party service provider computers 104. Users operating the electronic user devices 102 may generate the electronic requests through different platforms provided by the set of service provider computers 104. The electronic requests may be included in electronic messages, such as email messages. The electronic requests may comprise order data including the identifier of a user initiating the request, the identifier of at least one service provider computer, the identifier of a merchant satisfying the request, the requested items, and other relevant information. When the users submit electronic requests, such as online orders, from the platforms provided by different service providers, the service provider computers 104 may receive the online orders. The service provider computers 104 may transmit the received electronic requests to the analytic server 110.

The set of electronic user devices 102 may be any computing device allowing a user to interact with the analytic server 110 via the third-party service provider computers 104. The electronic user devices 102 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 102 may comprise any number of input and output devices supporting various types of data, such as text, image, audio, video, and the like. A customer/user operating the electronic user device 102 may issue an electronic request through the platforms provided by the third-party service provider computers 104. The platforms may be web applications (e.g., comprising a hyperlink of a website) and/or mobile applications installed in the electronic user devices 102. The platforms may comprise a graphical user interface (GUI) that allows customers to input user information and the requested item information by interacting with the GUI.

The third-party service provider computers 104 may be any computing device comprising a processor and other computing hardware and software components, configured to deliver electronic requests from the electronic user devices 102 to the analytic server 110. The third-party service provider computers 104 may provide platforms for the users to initiate electronic requests. For example, in the business of online food ordering, there may be many service providers for delivering the online food orders each communicating with third-party service provider computers 104.

Each of third-party service provider computers 104 may have its own database 105. Each of the third-party databases 105 may be any non-transitory machine-readable media configured to store the information of existing customers of the corresponding service provider platform and the order information generated by the customers. Each third-party service provider computer 104 may update its database 105 when there is a customer registered on its platform and/or there is a new order generated on its platform.

After the service provider computers 104 receive the online order electronic requests, the service provider computers 104 may transmit the received online orders to the analytic server 110. The analytic server 110 may execute an extraction protocol to extract the order data from the received electronic requests. The analytic server 110 may execute the extraction protocol by parsing the text of electronic messages (e.g., emails) and extract the order data details. The analytic server 110 may also store the extracted order data into the database 120.

The database 120 may be any non-transitory machine-readable media configured to store the extracted data of the electronic requests. For example, data in database 120 may comprise the requested items, the identifier of the user or customer making the order, name of the customer, the phone number/email address of the customer, the identifier of the platform (e.g., service provider computer) transmitting the online order, and the identifier of the merchant, the amount of the order, the date and time of the order, the delivery address of the order, the payment method, the status of the payment, and the like. The database 120 may include any other related data of the users, requests, the third-party service providers, and the merchants.

The analytic server 110 may generate a machine-readable file comprising the extract data. The analytic server may organize the order data based on the identifier of the merchant, so that the online orders for the same merchant are included in the same machine-readable file. The machine-readable file may comprise a table including all the order records for the same merchant. The analytic server 110 may transmit the machine-readable file to the merchant computing device 130. The merchant computing device 130 may populate a GUI according to the machine-readable file. For example, the GUI may display a table including the name of the customer, the phone number/email address of the customer, the ordered items, the amount of the order, the date and time of the order, the delivery address of the order, the payment method, the status of the payment, and the like.

The merchant computing device 130 may be any computing device allowing a merchant member to interact with the analytic server 110. The merchant computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The merchant computing device 130 may comprise any number of input and output devices supporting various types of data, such as text, image, audio, video, and the like.

The merchant may process or satisfy the electronic requests (e.g., online orders) displayed in the GUI of the merchant computing device 130. In some embodiments, the analytic server 110 may provide interactive components on the GUI to allow the merchant to update the status of the online orders. For example, the merchant may interact with buttons or other interactive components displayed on the merchant computing device 130 to update the status of the orders. The statuses of an order may include "not processed," "preparing," "ready," "out for delivery," and the like. The analytic server 110 may periodically update the service provider computers 104 with the order status. The service provider computers 104 may further update the electronic user devices 102 with the order status. For example, the analytic server 110 may send a push notification to the service provider computer 104 based on the merchant interacting with the GUI. Because the analytic server 110 displays all the online orders received via different service provider computers 104 in the same GUI, the merchant may be able to process the orders more efficiently. For example, the GUI may also include interactive components that allow the restaurant to search, aggregate, order the records corresponding to the online orders.

In some embodiments, the analytic server 110 may directly display the request on a point of sale (POS) device 140 associated with the merchant. The analytic server 110 may transmit the order data of the machine-readable file directly to the POS device 140. For example, the merchant may request the analytic server to transmit the order data to the merchant computing device 130 or the POS device 140 (or both). When the merchant chooses to transmit the order data to the POS device 140, the analytic server 110 may populate a GUI having different interactive graphical components on the POS device 140. The graphical components may correspond to the order data. For instance, each graphical component may correspond to an item within the request and its corresponding price. The merchant operating the POS device 140 may use the populated GUI to complete the transaction and satisfy the user request. For instance, the merchant operating the POS device 140 may complete the transaction by transmitting a payment request to the user (e.g., in-person payment methods or electronic payments using the user's payment information). The POS device 140 may initiate a payment request comprising an amount corresponding to the order and the user may pay the requested amount using the POS device 140 or any other payment method.

Figure 1C:
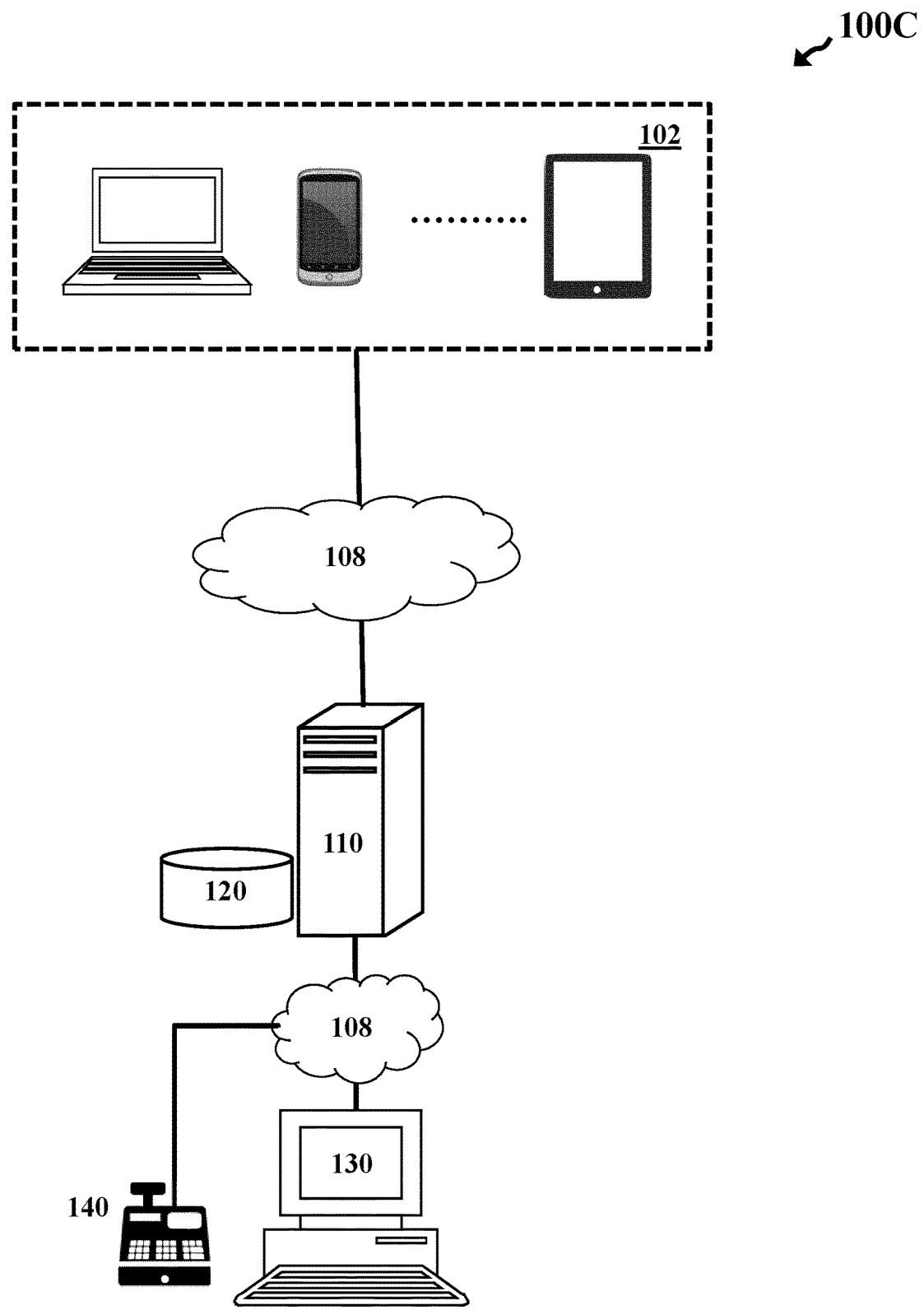
FIG. 1C illustrates components of a system for processing electronic request after user migration, according to an embodiment.

FIG. 1C illustrates components of a system 100C for processing electronic request after user migration, according to an embodiment. As discuss above, the analytic server 110 may extract the order data of the electronic messages received via different service provider platforms and store the order data into a database 120. After a certain period of time, the analytic server 110 may create its own dataset of all the customers for a particular merchant. These customer data may be valuable for building an internal online ordering platform for the merchant. Specifically, the analytic server 110 may create an online ordering platform that connects the merchant and the customers directly. Such an internal platform may allow the merchants to migrate all the customers from the third-party service providers to the merchants' own systems (hosted in the analytic server). As a result, the third-party service provider computers 104 in FIG. 1B may become unnecessary.

The system 100C be the system implemented by the analytic server 110 after user migration where the third-party service provider computers 104 in FIG. 1B are removed. The system 100C may comprise an analytic server 110, a database 120, a set of electronic user devices 102, and a merchant computing device 130 that are connected with each other via hardware and software components of one or more networks 108. The analytic server 110 may provide an internal online ordering platform that allows the users to initiate electronic requests. For example, the internal online ordering platform may be web applications and/or mobile application comprising a GUI displayed on the electronic user devices 102. Users may input user information and requested item information by interacting with the GUI.

The analytic server 110 may receive the electronic requests from the electronic user devices 102 via electronic messages (e.g., emails). The analytic server 110 may execute the extraction protocol by parsing the text of electronic messages (e.g., emails) and extract the order data details. The analytic server 110 may also store the extracted order data into the database 120. The analytic server 110 may generate a machine-readable file comprising the extract data. The analytic server 110 may transmit the machine-readable file to the merchant computing device 130. The merchant computing device 130 may populate a GUI according to the machine-readable file. For example, the GUI may display a table including the name of the customer, the phone number/email address of the customer, the ordered items, the amount of the order, the date and time of the order, the delivery address of the order, the payment method, the status of the payment, and the like. In some embodiments, the analytic server 110 may connect with the POS device 140 as described above. The merchant may view order details and complete the transactions as described above.

In the process of migrating the customers from the third-party service providers, the analytic server 110 may integrate the internal online ordering system with the third-party systems provided by the third-party service provider computer 104 in FIG. 1B. Specifically, the analytic server 110 may aggregate the orders coming through the third-party service provider computer 104 in FIG. 1B and the orders coming directly from the electronic user devices 102. The analytic server 110 may generate the machine-readable file that includes all the orders in one spot.

Figure 2:
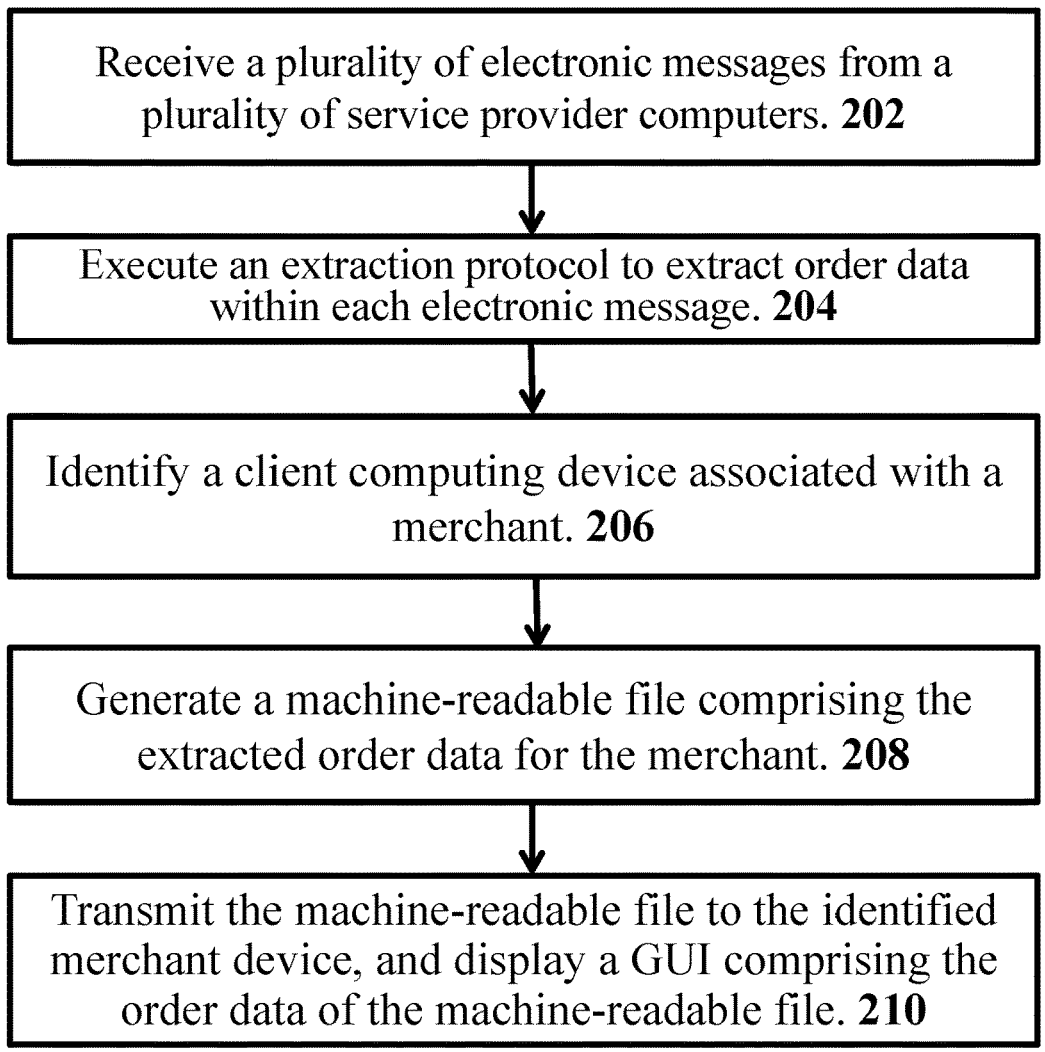
FIG. 2 illustrates a flowchart depicting operational steps for processing electronic requests, according to an embodiment.

FIG. 2 illustrates execution of a method 200 for processing electronic requests, according to an embodiment. Other embodiments may comprise additional or alternative steps, or may omit some steps altogether.

At step 202, the analytic server may receive a plurality of electronic messages corresponding to a plurality of requests from a plurality of service provider computers. Each electronic message may comprise order data corresponding to each request. The order data of each electronic message may comprise at least one requested item, a first identifier of a user initiating the request, a second identifier of at least one service provider computer within the plurality of service provider computers transmitting the electronic messages to the analytic server, and a third identifier of a merchant satisfying the request.

Users may generate the electronic messages through different service providers. The service providers may provide platforms for the users to initiate the electronic messages. When a user initiates an electronic message from the platform provided by a service provider, the service provider computer may receive the electronic message. For example, in the business of online food ordering, there may be many service providers for delivering the online food orders. When the users submit electronic requests, such as online orders, from the platforms provided by different service providers, the service provider computers may receive the online orders. The service provider computers may transmit the received online orders to the analytic server.

The analytic server may receive such electronic messages from the plurality of service provider computers. The received electronic messages may comprise the detailed information of the order data. For example, the electronic messages may be online orders for food from a restaurant. The order data may comprise the requested food, the identifier of the user or customer making the order, the identifier of the platform (e.g., service provider computer) transmitting the online order, and the identifier of the restaurant.

In some embodiments, the analytic server may receive the electronic messages via emails. In implementation, a merchant (e.g., the restaurant) may sign up with the service providers and select the option to have the electronic messages (e.g., online orders) delivered via emails. The merchant may input the email address of the analytic server. As a result, the service provider computers may transmit the online orders to the email address of the analytic server. The analytic server may receive the online orders in emails. The emails may comprise the order details, such as requested item details, the service provider identifier, the customer details including email address, phone number of the customer, the restaurant identifier, and a confirmation number.

At step 204, the analytic server may execute an extraction protocol to extract the order data corresponding to each request within each electronic message. The electronic message received from each service provider computer may include text that identifies order details (e.g., order timestamp, food requested, delivery method, tip, and payment method). The analytic server may execute the extraction protocol by parsing the text of electronic messages (e.g., emails) and extracting the order data including the requested items, the identifier of the user or customer making the order, the identifier of the platform (e.g., service provider computer) transmitting the order, and the identifier of the merchant that addresses and satisfies the order. The analytic server may also store the extracted order data into a database.

The analytic server may use data scraping techniques to extract the order data. Specifically, the analytic server may use text pattern matching, semantic annotation recognizing, natural language processing algorithms to extract the order data.

At step 206, the analytic server may identify a client computing device associated with the identifier of the merchant. As discussed above, the extracted order data may include the requested items, the identifier of the customer, the identifier of the platform, and the identifier of the merchant. The analytic server may determine the identifier of the merchant based on the extracted order data. The analytic server may further identify the computing device associated with the identifier of the merchant.

The analytic server may require the merchant to sign up or register with the analytic server by installing an application software on the client computing device associated with the merchant. The client computing device may run the application and communicate with the analytic server via the application. In the registration process, the analytic server may record the client computing device of each merchant in a database. The analytic server may identify the client computing device corresponding to a merchant by retrieving the database based on the identifier of the merchant.

At step 208, the analytic server may generate a machine-readable file comprising the extracted order data for the merchant. The analytic server may receive online orders made by different customers and requesting items from different merchants. The analytic server may organize the order data based on the identifier of the merchant, so that the online orders for the same merchant are included in the same machine-readable file. The machine-readable file may comprise a table including the name of the customer, the phone number/email address of the customer, the ordered items, the amount of the order, the date and time of the order, the delivery address of the order, the payment method, the status of the payment, and the like.

Whenever the analytic server receives a new order, the analytic server may update the machine-readable file by adding a new record in the table of the machine-readable file. The analytic server may organize the data records in the order of time, so that the merchant may be able to process the orders on the first come first serve basis. In some embodiments, the analytic server may provide the service of jumping the line for some addition fees. For example, the analytic server may display a GUI such as a button that allows a customer to pay addition 15 dollars to get the service first. Once the customer clicks on the button, the analytic server may update the database and/or the machine-readable file by changing a status of the order to high priority. The analytic server may further update the GUI of the merchant computing device by marking the corresponding order as high priority or sending push notification.

In some embodiments, whenever the analytic server receives a new electronic request (e.g., a new order), the analytic server may transmit a push notification comprising the new to the merchant device to inform the merchant. The notification may be a dialog box having the interactive components for the merchant to deny or confirm the order. After the merchant confirms the order, the analytic server may update the machine-readable file by adding a new record into the machine-readable file.

At step 210, the analytic server may transmit the machine-readable file to the identified client computing device of the merchant. The identified client computing device may populate a GUI according to the machine-readable file. The GUI may comprise a first indicator corresponding to the requested item and a second indicator corresponding to the second identifier.

As discussed above, the analytic server may generate a machine-readable file that includes all the orders for the same merchant. The merchant computing device may populate a. GUI to display the order data included in the machine-readable file. Specifically, the GUI may comprise a first indicator for the requested items and a second indicator of the service provider identifier. For example, a restaurant computing device may display that an order requesting pepperoni pizza and the order came through a particular service provider.

In implementation, the GUI may comprise other additional information of each order. For example, the GUI may display a table including the name of the customer, the phone number/email address of the customer, the ordered items, the amount of the order, the date and time of the order, the delivery address of the order, the payment method, the status of the payment, and the like.

The merchant may process or satisfy the electronic requests (e.g., online orders) displayed in the GUI. For example, a restaurant may process the online orders based on the time the orders are received. The restaurant may prepare the meals sequentially so that the customers who placed the order earlier can get the meals sooner. When the analytic server provides the option for jumping the line with additional fees, the restaurant may process the online orders based on the priority status of the orders and then based on the time the orders are received.

In some embodiments, the analytic server may provide interactive components on the GUI to allow the merchant (e.g., the restaurant) to modify and update the status of the online order, such as the status of preparation of the meals. For example, the GUI may include a "start preparing" button and a "finish preparing" button for each of the online order. Cooking members from the restaurant may interact with the buttons to update the status of the preparation of the meals. The statuses of an order may include "not processed," "preparing," "ready," "out for delivery," and the like. The analytic server may periodically update the service providers with the order status by transmitting the status of each order to the corresponding service provider computer. The service providers may further update the customers with the order status. For example, the analytic server may send a push notification to the service provider computers and/or customers' devices based on the merchant interacting with the GUI. For example, the restaurant may update an online order status as "out for delivery" when the meal was picked up by a driver and send a push notification to the customer notifying the customer that his/her food was picked up by the driver. The analytic server may also send a push notification comprising the status of "out for delivery" to the corresponding service provider computer.

A customer may have the options to have the requested items delivered or pick up at the merchant store when placing the online order. In case the customer selects to have the requested items delivered, the analytic server may update the delivery status on the customer computing device. For example, the analytic server may show the driver's real time location in the path from the merchant store to the customer's delivery address. In case the customer selects to pick up the requested items at the store, the analytic server may transmit the order data of the machine-readable file to a POS device associated with the merchant. The POS device may initiate a payment request comprising the amount of the order. The customer may pay the requested amount on the POS device. In some embodiments, the customer may submit the payment using online payment methods when placing the order.

Because the analytic server displays all the online orders received via different service provider platforms in the same GUI, the merchant may be able to process the orders more efficiently. The merchant may sign up with many third-party service providers to increase the customer volume without having to manage their many hardware devices. The GUI may also include interactive components that allow the restaurant to search, aggregate, order the records corresponding to the online orders. The merchant may be able to search certain orders based on keywords, and aggregate the orders requesting the same items to prepare the items in batch. The merchant may also be able to sort the orders based on different criteria, such as time, the amount, the payment status. Because all the orders are in one spot, the merchant may perform statistical calculations and generate sales reports more efficiently.

As discuss above, the analytic server may extract the order data of the electronic messages received via different service provider platforms and store the order data into a database. As a result, the analytic server may obtain the customer data, including the customer name, customer email address, customer phone number, customer delivery address, customer requested items, and the like. After a certain period of time, the analytic server may have its own dataset of the customers for a particular merchant. In conventional methods, the third-party service providers have the customers' data because the customers use the third-party service provider platforms to place the online orders. The merchants may have to pay for the third-party service providers for receiving online orders through their platforms. For example, the merchants may pay 30% commission for such online order delivery services.

The systems and methods described herein may create the customer dataset by collecting the online orders from different service providers, extracting the customer data, and save the extracted customer data into a database. These customer data may be valuable for building an internal online ordering platform for the merchant. Specifically, the analytic server may create an online ordering platform that connects and communicates with the merchant and the customers directly. Because the analytic server has all the customers' data and can communicate with the customers directly, the analytic server may use the customer data to do marketing for the merchant and the merchant internal online ordering platform. For example, after a meal is delivered to a customer, the analytic server may send a SMS (short message service) message to the customer using the customer contact information. The message may promote the restaurant internal platform by including the identifier or the object interface (e.g., HTML address) of the internal platform. For example, the message may include languages, such as "Hope you enjoy the meal. Why don't you make your next order from our internal online ordering platform?" In this way, the analytic server may acquire the customers and migrate the customers to the internal online ordering system over time. Such an internal platform may allow the merchants to migrate all the customers from the third-party service providers to the merchants' own systems (hosted in the analytic server). As a result, the merchants may save a large amount of money from paying the third-party service providers commission fees and maximize their revenue.

In the process of migrating the customers from the third-party service providers, the analytic server may integrate the internal online ordering system with the third-party systems. Specifically, no matter where the online orders come from, whether they come from the third-party provider platforms or the internal online ordering platform, the analytic server may aggregate the orders and generate the machine-readable file that includes all the orders in one spot.

Figure 3:
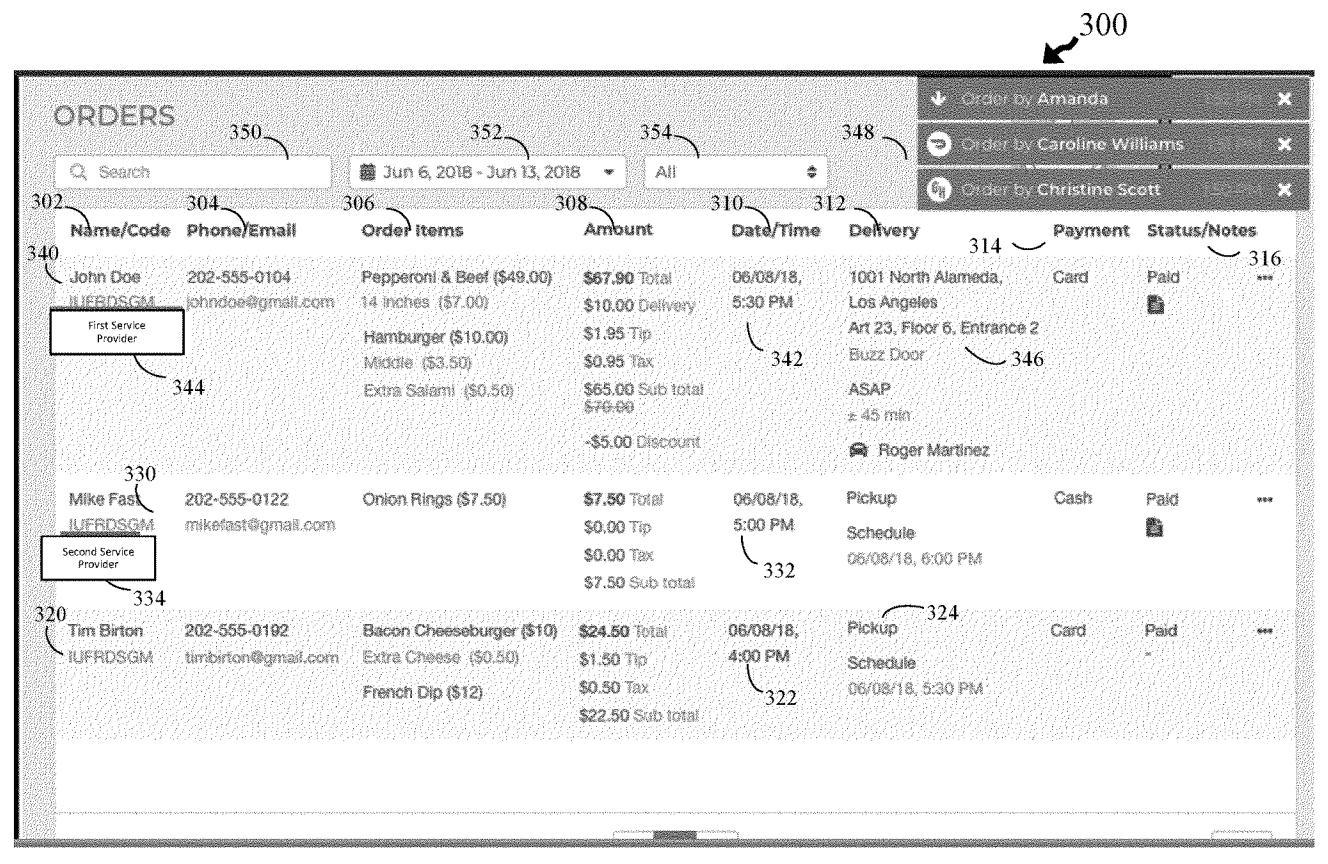

FIG. 3 illustrates an example of a graphical user interface 300 displayed on a merchant computing device, according to an embodiment. The GUI 300 may comprise a table including all the orders for the same merchant coming through different third-party service provider computers. For example, the GUI 300 may display a table including the identifier (e.g., name or code) of the customer 302, the phone number/email address 304 of the customer, the ordered items 306, the amount of the order 308, the date and time of the order 310, the delivery status of the order 312, the payment method 314, the status of the payment 316, and the like. The delivery status of the order 312 may comprise the delivery address 346 when the user selects to have the items delivered, and the pickup schedule 324 when the user selects to pick up the items.

In this example, The GUI 300 may display the order records received by a pizzeria. The GUI 300 may display the order records in the order of time. For example, a first order 320 from Tim Birton came at 4:00 pm 322 and the second order 330 from Mike Fast came at 5:00 pm 332, and a third order 340 from John Doe came at 5:30 pm 342. The GUI may display the orders according to the time of the order being received as shown in the figure.

The GUI 300 may also comprise an indicator of the identifiers of the third-party service providers. For example, the order 340 may come through a first service provider 344. The order 330 may come through a second service provider 334. Whenever there is a new electronic request, the analytic serve may send a push notification 348 to the merchant computing device to notify the merchant.

The GUI 300 may also include interactive components that allow the merchant to manage the orders efficiently. For example, the merchant may be able to search certain orders by inputting keywords in text box 350. The merchant may be able to select orders based on date using the calendar component 352. The merchant may also be able to select orders based on different criteria provided in dropdown menu 354.

Figure 4:
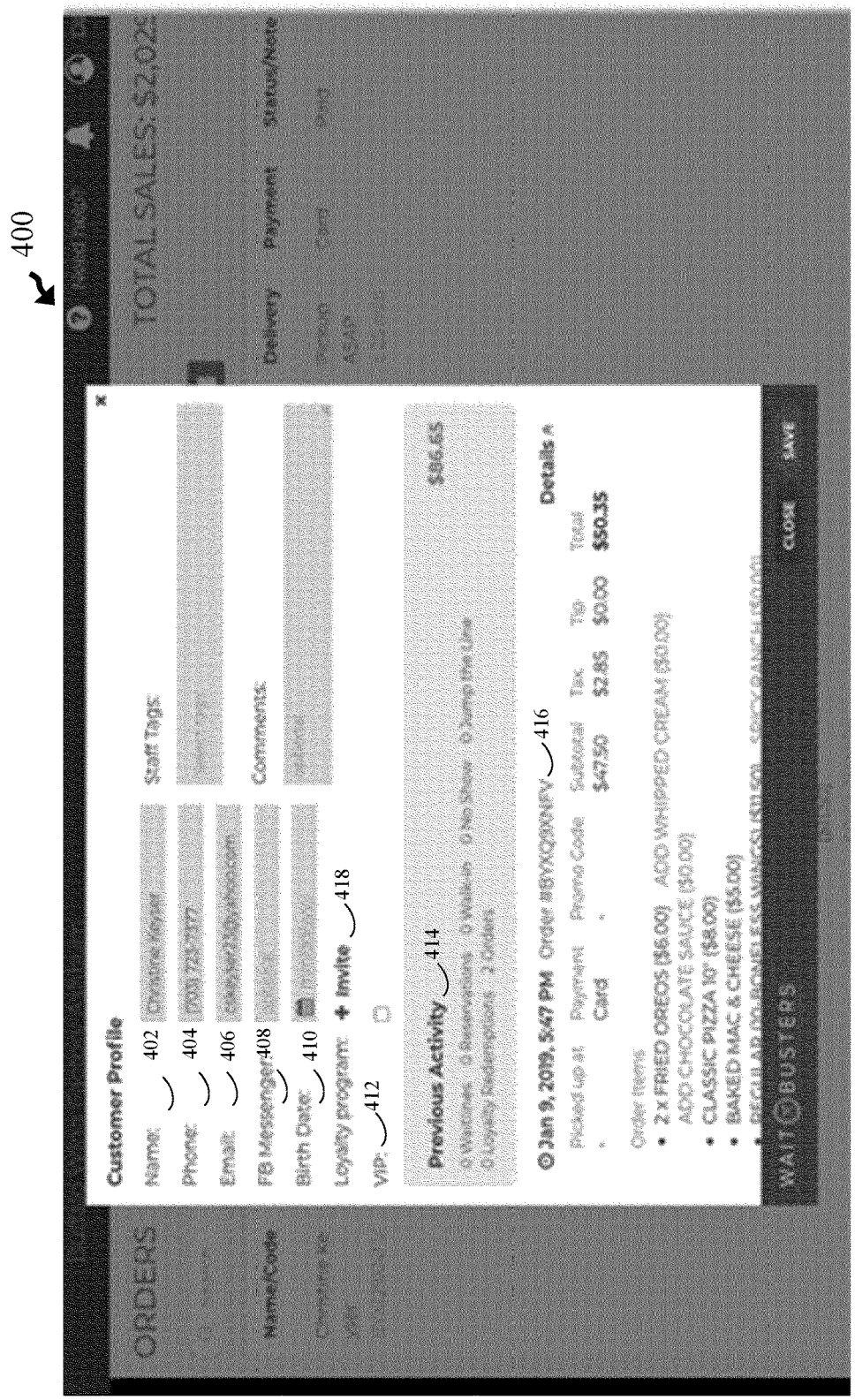
FIG. 4 illustrates an example of a graphical user interface for managing customer profiles, according to an embodiment.

FIG. 4 illustrates an example of a graphical user interface 400 for managing customer profiles, according to an embodiment. When the merchant interacts with the identifier of a specific customer (e.g., clicking on the customer's name) in the table of all the orders (as shown in FIG. 3), the analytic server may provide the GUI 400 for the customer's profile.

The GUI 400 may comprise detailed customer information. For example, the GUI 400 may include the user name 402, phone number 404, email address 406, Facebook messenger 408, birth date 410, VIP status 412, previous activity 414, order history 416 and the like. The order history may include order details for each previous order, such as the order confirmation number, previously ordered items, payment information. Furthermore, the GUI 400 may comprise an interactive component 418 for inviting the user into a loyalty program. The loyalty program may invite the user to use the internal online ordering platform instead of the third-party service providers for making new orders. By interacting with the inviting component 418, the merchant may transmit an electronic message (e.g., SMS message or email) comprising the object interface (e.g., HTML address) of the internal platform to the user's electronic device.

Figure 5:
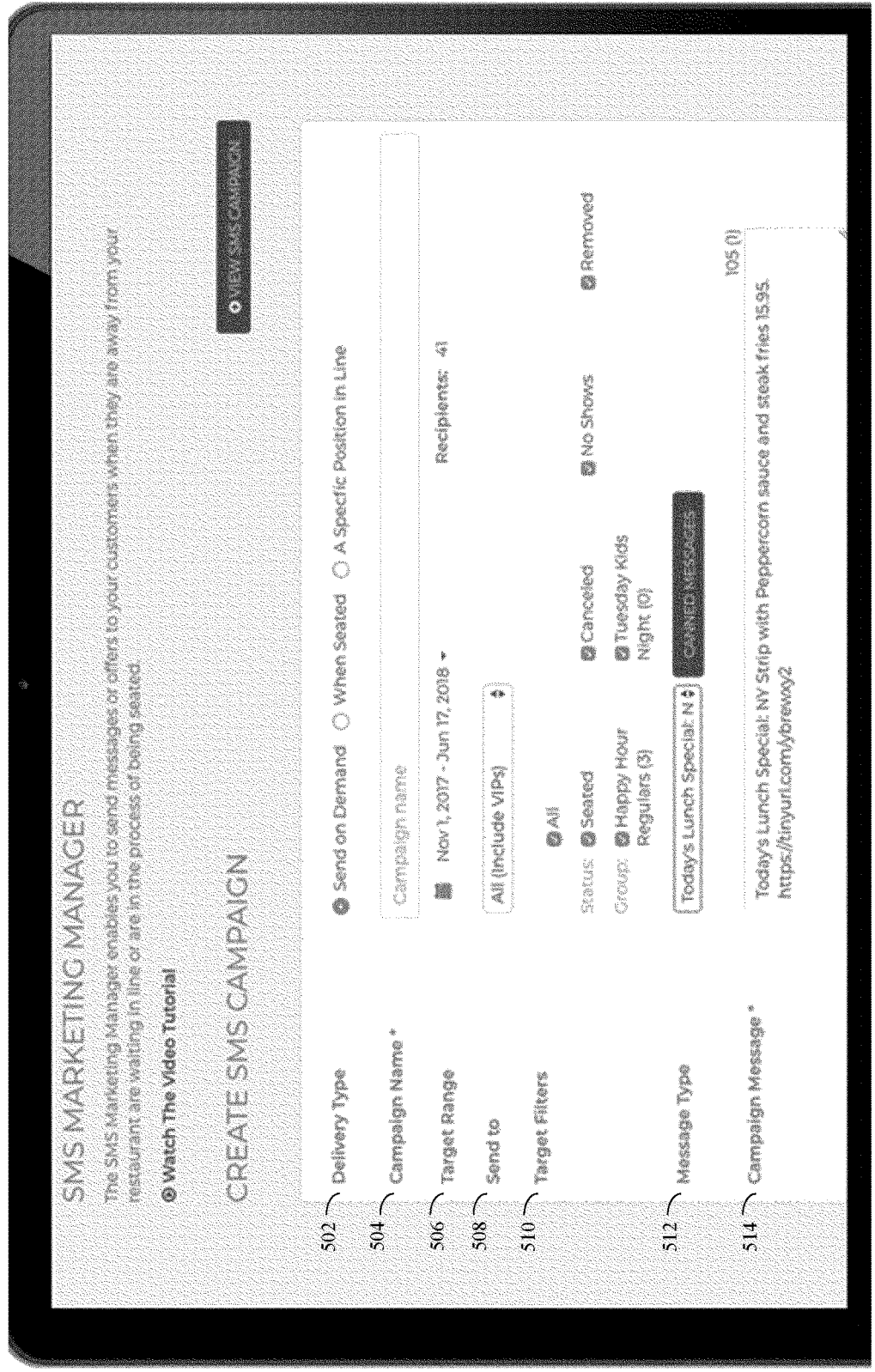
FIG. 5 illustrates an example of a graphical user interface for sending marketing messages to customers, according to an embodiment.

FIG. 5 illustrates an example of a graphical user interface 500 for sending marketing messages to customers, according to an embodiment. As discussed above, after the analytic server acquires customer data and saves the customer data into a database, the analytic server may use the customer data for marketing purposes. FIG. 5 illustrates a GUI displayed by the analytic server on the merchant computing device that allows the merchant to launch different marketing campaigns.

The GUI 500 may allow the merchant to create SMS campaign and transmit SMS messages comprising promotion materials to the customers when the customers are away from the merchant store, or are waiting in line, or are in the process of being seated. The GUI 500 may comprise delivery type 502 that indicates when to send the electronic messages, such as send on demand, when the customer is seated, or when the customer is at a specific position in line. The GUI 500 may comprise a text box for campaign name 504 that allows the merchant to input the name in the text box. The GUI 500 may comprise a target range 506 comprising a calendar component to allow the merchant to select customers based on date. For example, the merchant may select customers who have made orders during Nov. 1, 2017 to Jun. 17, 2018. The GUI 500 may comprise a dropdown menu for selecting the customers to be sent to 508, such as all customers, VIP customer only, or any other subset of the customers. The GUI 500 may comprise target filters 510 including a plurality of criteria for the merchant to select by checking or unchecking a box corresponding to each criteria. The GUI 500 may also comprise message type 512 comprising a dropdown menu with different options for the marketed campaign, such as lunch special, or happy hour special, or dinner special, and the like. The GUI 500 may also comprise a campaign message text box 514 for the merchant to input the message text to be sent to the customers.

Figure 6:
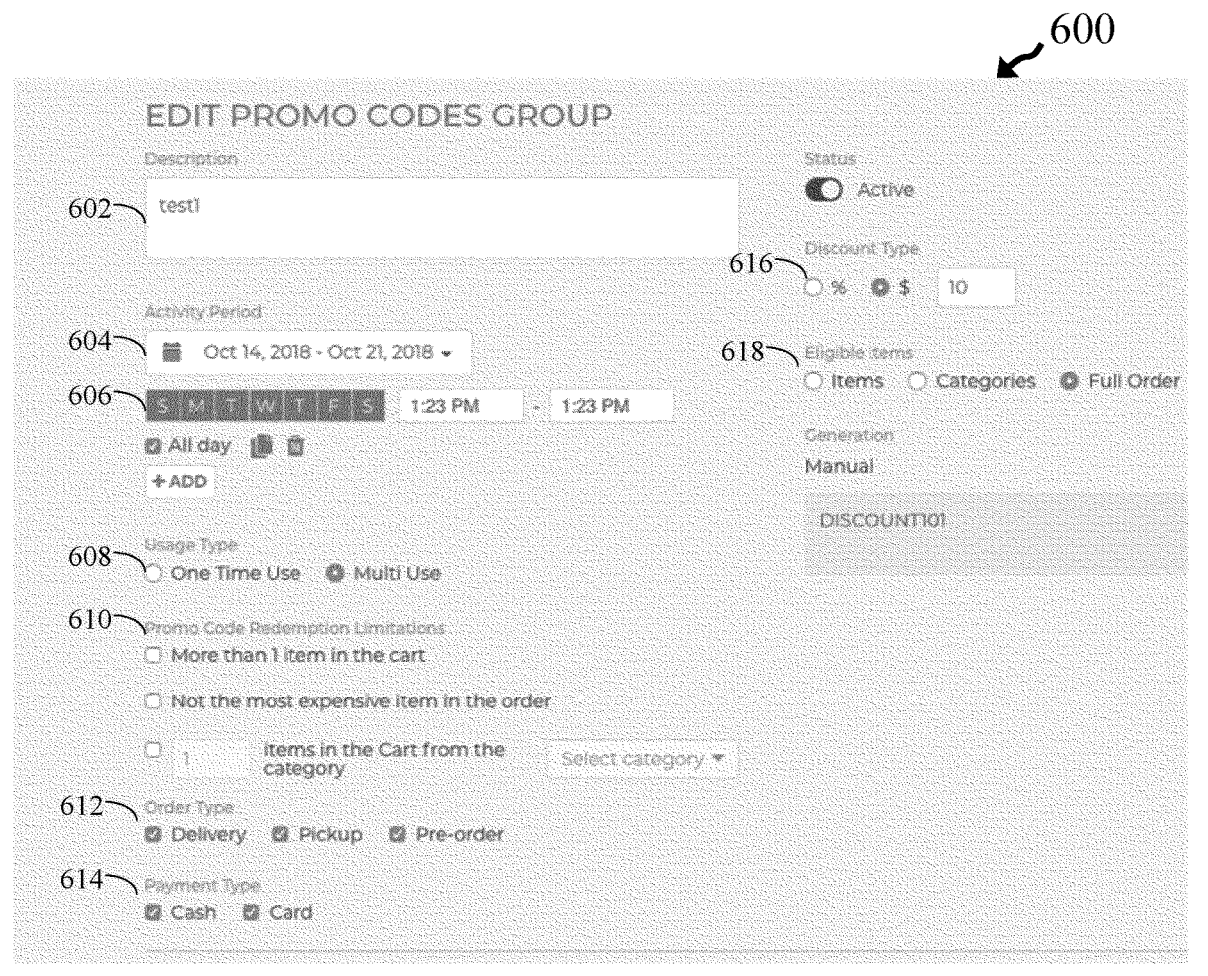

FIG. 6 illustrates an example of a graphical user interface 600 for editing a promotion message, according to an embodiment. The GUI 600 may comprise a text box 602 to input description of the promotion. The GUI 600 may also comprise a calendar component 604 for setting up the action period, interactive components 606 for setting the promotion code and time. The GUI 600 may also comprise radio buttons 608 for usage type, such as one time use or multi use. The GUI 600 may comprise radio buttons 610 for selecting promotion code redemption limitation, radio buttons 612 for selecting order type, radio buttons 614 for selecting payment type, radio buttons 616 for selecting discount type, radio buttons 618 for selecting eligible items, and the like.

Figure 7A:
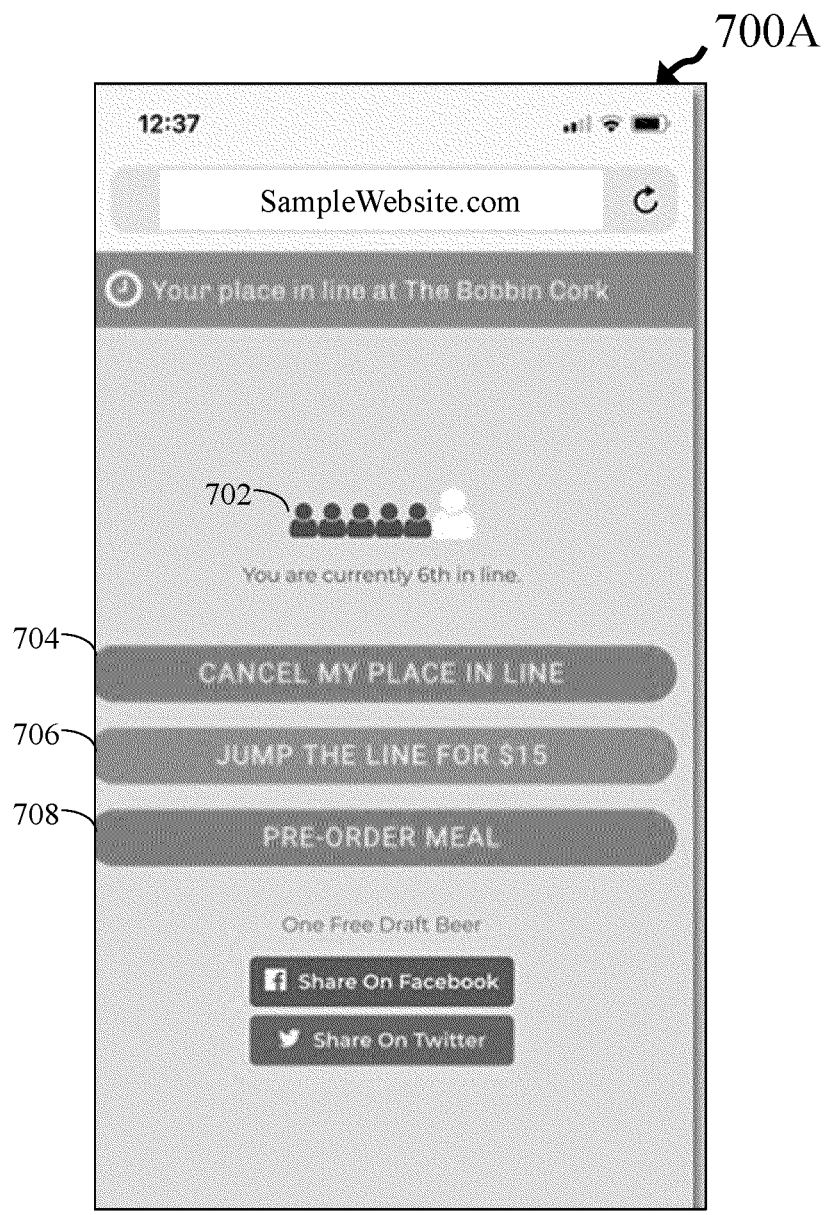
FIGS. 7A-7B illustrate an example of graphical user interfaces for a customer to submit an order, according to an embodiment.
Figure 7B:
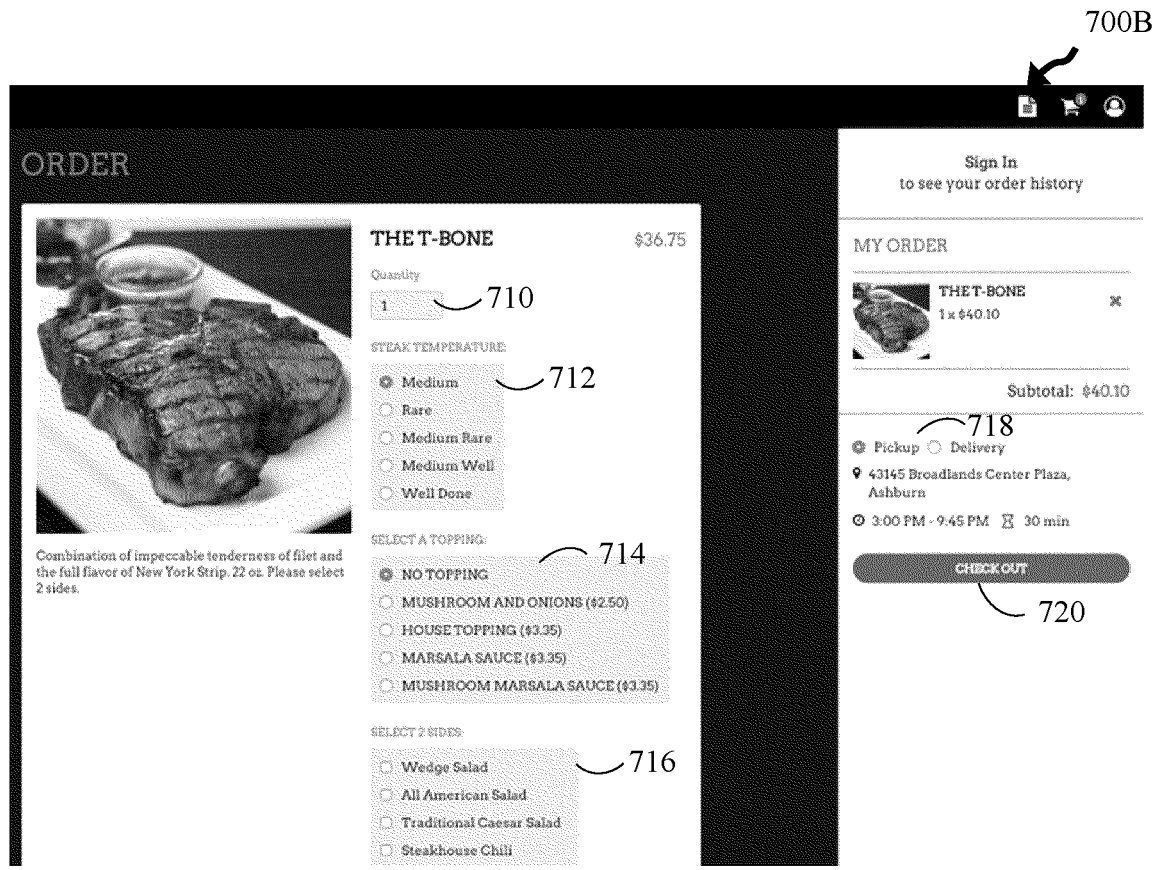

FIGS. 7A-7B illustrate an example of graphical user interfaces for a customer to submit an order, according to an embodiment. The internal online ordering platform provided by the analytic server may comprise a GUI 700A for the users waiting online. The GUI 700A may show the user's current place in line 702. The GUI 700A may also comprise the interactive components (e.g., buttons) for the user to cancel his/her place in line 704, jump the line for extra fee 706, and submit pre-orders 708. When the user interacts with the pre-order interactive component 708, the analytic server may display the GUI 700B for the user to submit an online order. The GUI 700B may comprise menu for the user to select items. Once the user selects the item, the analytic server may display interactive components for the user to input details of the ordered items. In this example, after the user selects the steak dish "T-Bone", the analytic server may display a dropdown menu 710 for the user to select the quality in GUI 700B, Furthermore, the GUI 700B may comprise a first radio button group 712 for the user to select the steak temperature, a second radio button group 714 for the user to select a topping, and a third radio button group 716 for the user to select sides. In addition, the GUI 700B may comprise interactive components 718 to provide the options of picking up the order or having the order delivered. The GUI 700B may also comprise an interactive component (e.g., a "check out" button) 720 for the user to pay for the order.

The internal online ordering system of the analytic server may allow the users to submit online orders through different interfaces. For example, the user may be able to submit online orders on a website, through virtual assistants (e.g., Amazon Alexa), through Facebook messenger chatbot, on the merchant's Facebook business page, or via. SMS messages. Furthermore, the internal online ordering system of the analytic server may allow the merchants to create and edit the menus.

Non-Limiting Example:

An analytic server receives multiple entails from different food delivery platforms. Each email corresponds to an online order for a different user. Each email also includes order details, such as food order request, special requests, payment information, user's address, name of the user, name of the platform, and other relevant order data. The analytic server executes an extraction protocol and parses the text within each email. The analytic server then identifies the pertinent order detail using the parsed text of each email. For instance, the analytic server identifies a restaurant to which the order is directed and other order information discussed above. The analytic server then aggregates all the orders directed to each identified restaurant and generates a graphical user interface displaying all the order information. The analytic server then transmits the graphical user interface to the identified restaurant's computer where an admin can interact with the graphical user interface to manage and satisfy the online orders.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
receiving, by a server from a plurality of service provider computers, a plurality of electronic messages corresponding to a plurality of requests, each electronic message comprising order data corresponding to each request, the order data of each electronic message comprising:
at least one requested item,
a first identifier of a user initiating the request,
a second identifier of at least one service provider computer within the plurality of service provider computers transmitting the electronic message to the server, and
a third identifier of a merchant satisfying the request;
executing, by the server, an extraction protocol to extract the order data corresponding to each request within each electronic message;
identifying, by the server, a client computing device associated with the merchant;
generating, by the server, a machine-readable file comprising the extracted order data; and
transmitting, by the server, the machine-readable file to the identified client computing device, whereby the identified client computing device populates a graphical user interface according to the machine-readable file, the graphical user interface comprising a first indicator corresponding to the requested item and a second indicator corresponding to the second identifier.

2. The method of claim 1, further comprising:
transmitting, by the server, the machine-readable file to a point of sale device associated with the merchant causing the point of sale device to initiate a payment request.

3. The method of claim 1, wherein the graphical user interface comprises interactive components to allow the merchant to update status of each request.

4. The method of claim 1, further comprising:
periodically transmitting, by the server, status of each request to the service provider computer that transmitted the request to the server based on the merchant interacting with the graphical user interface.

5. The method of claim 1, wherein the graphical user interface comprises a table including a name of the user, a phone number of the user, an email address of the user, the at least one requested item, an amount of an order corresponding to the request, a date and a time of the order, a delivery address of the order, a payment method, and a payment status.

6. The method of claim 1, further comprising:
storing, by the server, the order data into a database, the order data comprising user data of a set of users initiating requests; and
generating, by the server, a second graphical user interface on electronic user devices associated with the set of users that is configured to receive requests from the set of users.

7. The method of claim 1, further comprising:
creating, by the server, an internal online ordering system that communicates with the user and the merchant directly.

8. The method of claim 1, further comprising:
displaying, by the server, the extracted order data in the graphical user interface according to a time of each order being received.

9. The method of claim 1, further comprising:
storing, by the server, the order data into a database, the order data comprising user data of a set of users initiating requests; and
generating, by the server, a third graphical user interface on the client computing device associated with the merchant that is configured to transmit electronic messages comprising promotional materials to the set of users.

10. The method of claim 1, further comprising:
transmitting, by the server, a push notification to the client computing device associated with the merchant when there is a new electronic message.

11. The method of claim 1, further comprising:
receiving, by the server from the plurality of service provider computers, the plurality of electronic messages via emails.

* * * * *